United States Patent [19]

LaBerge et al.

[11] Patent Number: 5,254,998
[45] Date of Patent: Oct. 19, 1993

[54] EXECUTIVE MONITOR FOR MICROWAVE LANDING SYSTEM

[75] Inventors: Edward F. C. LaBerge; Robert J. Kelly, both of Baltimore, Md.

[73] Assignee: AlliedSignal Inc., Morris Township, Morris County, N.J.

[21] Appl. No.: 970,202

[22] Filed: Nov. 2, 1992

[51] Int. Cl.$^5$ ............................................. G01S 7/40
[52] U.S. Cl. ............................ 342/173; 342/35
[58] Field of Search ............................ 342/173, 35

[56] References Cited

U.S. PATENT DOCUMENTS

| | | | |
|---|---|---|---|
| 4,333,081 | 6/1982 | Höfgen | 342/407 |
| 4,757,316 | 7/1988 | Brault et al. | 342/173 |
| 4,768,035 | 8/1988 | Thurber et al. | 342/194 |
| 4,916,451 | 4/1990 | Ishita | 342/25 |
| 5,130,716 | 7/1992 | Kleiber | 342/173 |
| 5,132,692 | 7/1992 | LaBerge | 342/173 |
| 5,187,486 | 2/1993 | Kölzer | 342/360 |

*Primary Examiner*—John B. Sotomayor
*Attorney, Agent, or Firm*—Howard G. Massung

[57] ABSTRACT

A method and means for monitoring a Microwave Landing System (MLS) that provides statistical independence of the monitoring process from the MLS to insure the integrity of the MLS signal format. The r.f. signal transmissions are received by a monitor receiver and down converted to i.f. signals. The i.f. signals are decomposed into in-phase (I) and quadrature (Q) components. The I and Q components are applied to a digital signal processor that derives all synchronizing information from the I and Q components and that effectively reconstructs the complete MLS signal format from the I and Q components. The reconstructed signal format is compared with predetermined standards and an alarm is generated if the reconstructed signal format is out of tolerance. The integrity of the monitoring process is insured by periodically substituting i.f. signals that simulate the MLS signal format but that are out of tolerance. An alarm is generated if the monitor fails to detect the out of tolerance condition of the simulated signal format.

5 Claims, 4 Drawing Sheets

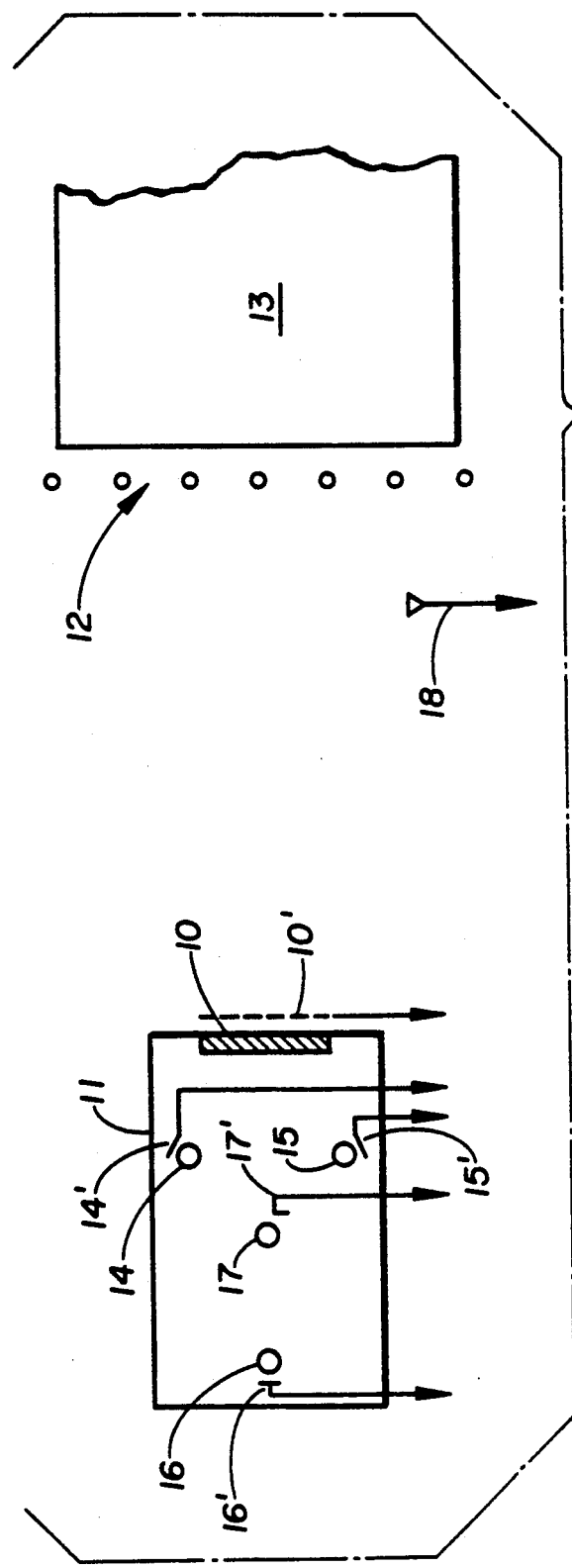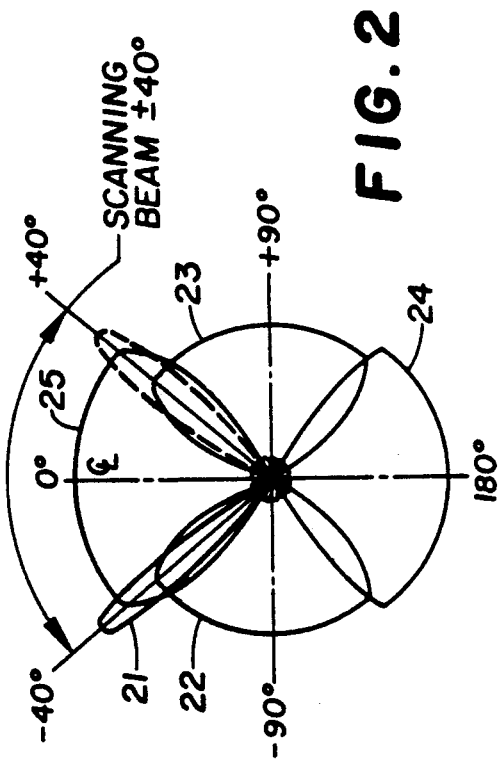

EXECUTIVE MONITOR FOR MICROWAVE LANDING SYSTEM

FIELD OF THE INVENTION

The present invention relates to Microwave Landing Systems (MLS). More particularly, it relates to a method and means for monitoring the signals transmitted by a ground-based MLS to verify, completely independently of the ground-based MLS, that such signals conform to all prescribed standards for accuracy of data and guidance information, signal rates and formats, effective radiated power and system integrity.

BACKGROUND OF THE INVENTION

The executive monitor functions as a supervisor of all aspects of the signal transmissions of an MLS to insure that the MLS integrity performance requirements are being met. The executive monitor must be sensitive to relatively small variations in a wide range of signal parameters. It must have sufficient accuracy and cognition to eliminate false alarms, while retaining the ability to respond to catastrophic failures in less than one second. It should be capable of verifying its own ability to measure out of tolerance conditions and must be sufficiently reliable to satisfy the continuity of service requirements of the MLS. In order to guarantee that the probability of the transmission of erroneous information by the MLS is less than $0.5 \times 10^{-9}$, the executive monitor should operate completely independently of any control cooperation or other shared relationship with the MLS being monitored.

Prior monitoring methods or systems lack the complete physical and electrical isolation of the monitor from the ground electronics unit that is needed to avoid hidden dependencies between the monitor and the ground unit. The majority of monitoring methods in use employ a plurality of distributed internal sensors to measure signal status at critical points in the signal formation process of the ground unit. The measurements of the sensors are compared with prescribed standards and the findings of the comparisons are consolidated to imply a global measure of the MLS signal integrity.

Certain of the prior methods use an R.F. receiver to derive the signal parameter being monitored from the R.F. signal transmitted by the MLS. For example, U.S. Pat. No. 4,764,772, issued Aug. 16, 1988, for "Scanning Beam Microwave Landing System", discloses a monitoring method employing a monitoring facility having some of the attributes of an airborne MLS receiver. The monitor facility includes an R.F. unit, an I.F. unit, a data demodulator and means for determining the time of arrival of the scanning beam. The R.F. unit is a single channel device tuned to the frequency of ground unit being monitored. synchronizing signals for the monitor are derived from the ground unit. No provisions are made for monitoring MLS signal parameters other than data transmitted by the scanning beam antenna and the arrival time of the scanning beam.

Such prior monitoring methods and means are clearly not statistically independent of the MLS ground unit. Also, prior monitor systems are incapable of validating their own performance, so that it is necessary to employ redundant monitors to verify monitor integrity.

It is an object of the present invention to provide a method and means for monitoring all aspects of the signals transmitted by an MLS ground unit, which method and means are statistically independent of the MLS ground unit.

It is another object of the invention to provide a method and means for monitoring the signal transmissions of an MLS ground unit, which method and means includes the ability to self verify the integrity of the monitoring process being performed.

Other objects and advantages of the invention will become evident as a complete understanding thereof is gained from the following complete description and accompanying drawings.

SUMMARY OF THE INVENTION

Briefly, the invention is based on the concept that the MLS ground unit builds up the MLS signal format from component parts, such as timing information, encoded data, and signal amplitudes, and radiates the signal format into selected sectors of space. A fully functional airborne MLS receiver, in turn, breaks down the radiated signal format into its component parts to derive the desired guidance information. That is, the airborne receiver functionally inverts the operation of the ground system.

This invention extends the concept by utilizing a fully functional MLS receiver configured as an executive monitor to measure all critical signal parameters directly from the signal format radiated into all sectors of space by the MLS ground unit.

The monitor receives the complete radiated signal format through an integral monitor antenna group that includes individual signal pick-ups associated with each of the ground unit Out-of-Clearance Indicator (OCI) antennas, data antenna, and scanning array antenna. The radiated signal format received by a field monitor antenna is also applied to the monitor through a selector switch. The monitor includes a receiver comprising a C-band down-converter controlled by a frequency synthesizer that is tunable to all MLS frequency channels. The down-converter converts the R.F. signal format into a relatively low I.F. which is then transformed to digital form by an A/D converter. The digitized I.F. signal is decomposed into in-phase (I) and quadrature (Q) components by a synchronous detector. The I and Q components are processed in a digital signal processor to recover DPSK (Differential Phase Shift Keying) data; to provide coherent envelope detection for measuring signal amplitudes and the arrival times of the scanning beams; to refocus near field antenna pattern data into a far field antenna pattern; and to determine the status the array aperture through an FFT-based algorithm.

The monitor derives all timing information by synchronizing its internal clock with the ground unit clock through demodulation of the Barker code (known per se) contained in the preamble of the signal format, thereby maintaining complete independence of the monitor from the ground unit.

The monitor has the ability to self-verify the integrity of all monitoring processes being performed. Self-verification is accomplished by periodically substituting a simulated I.F. signal for the I.F. signal of each of the functions being monitored, where the simulated signal corresponds to a particular function signal, except that the simulated signal is out of tolerance. A properly operating monitor responds to the simulated signal with an alarm.

DESCRIPTION OF THE DRAWINGS

FIG. 1 is a simplified plan showing the disposition about an airport runway of the antennas of an MLS ground-based azimuth guidance unit and the monitor signal pick-ups associated therewith.

FIG. 2 is a plot showing the coverage of a typical MLS azimuth scanning beam and OCI antennas.

DETAILED DESCRIPTION OF THE INVENTION

Figures 3, 4, 5:
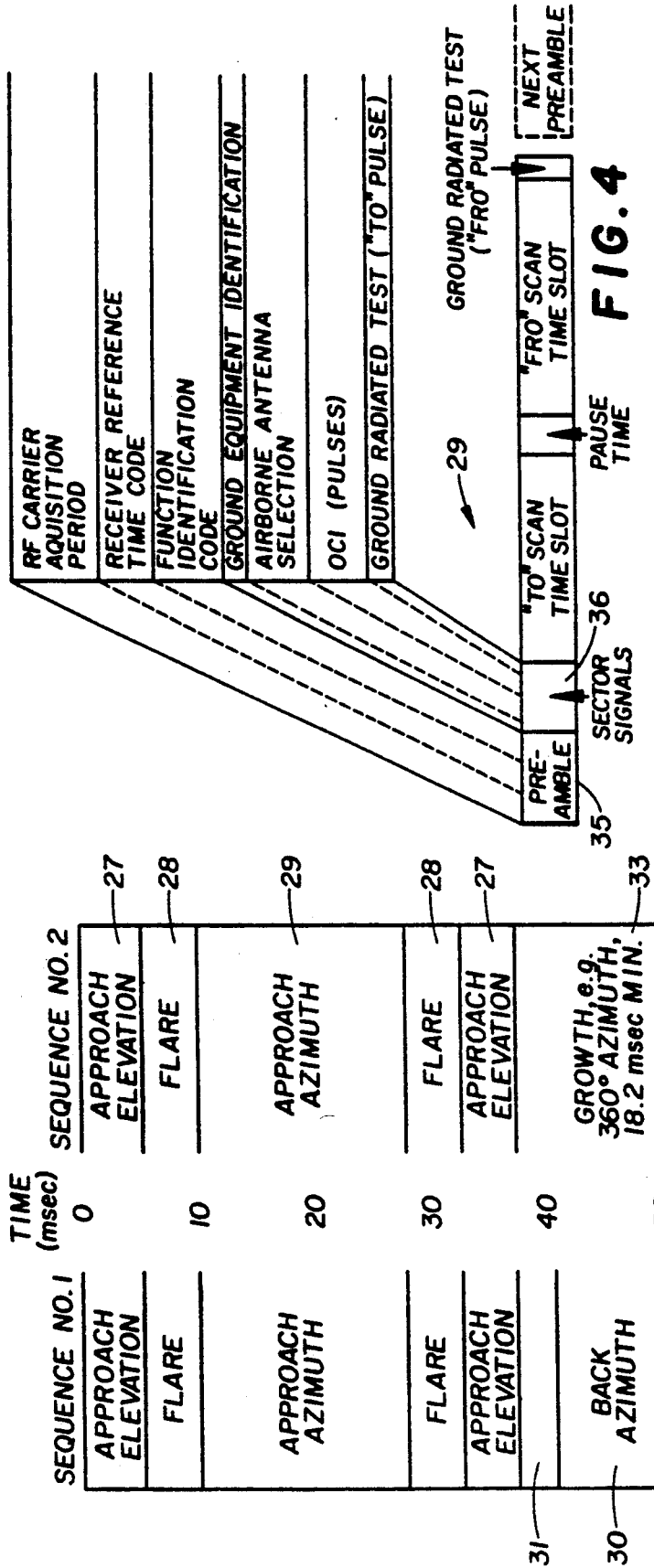
FIG. 3 is a chart showing the arrangement of the time frames in sequence #1 and sequence #2 of the Time Division Multiplex (TDM) signal format used in the MLS.
FIG. 4 is a chart showing the contents of an azimuth time frame of the signal format.
FIG. 5 is a chart showing the arrangement of sequences #1, #2, and data words in a complete cycle of the TDM signal format.

FIG. 1 shows a typical airport installation of the antennas for an MLS azimuth guidance ground unit. The array antenna 10 is located in a protective shelter 11 normally placed about 200 feet from any obstructions, such as runway lights 12, at the stop end of the runway 13, along the runway center line. Also contained within the shelter 11 are a left OCI antenna 14, a right OCI antenna 15, a rear OCI antenna 16, and a data antenna 17. The group of antennas located at shelter 11 provides coverage for the MLS signal format transmitted by the azimuth ground unit as shown in FIG. 2.

Referring to FIG. 2, array antenna 10 sweeps the scanning beam 21 through a sector of ±40° about the runway center line. Left OCI antenna 14 transmits a pulse at the assigned time in the signal format through a sector 22 of about 90° width, centered on the −90° azimuth bearing. Right OCI antenna 15 transmits a pulse at the assigned time through a sector 23 of about 90° width, centered on the +90° azimuth bearing. Rear OCI antenna 16 transmits a pulse at the assigned time through sector 24 of about 90°, centered on the 180° azimuth bearing. Data antenna 17 transmits DPSK data or identification signals at assigned times through a sector 25 of about 90°, centered on 0° azimuth bearing. Data transmissions may be made using antennas 14–17 simultaneously when omnidirectional coverage is desired.

FIG. 3 broadly illustrates sequence numbers 1 and 2 of the Time Division Multiplex (TDM) signal format of a typical MLS installation. Each sequence contains time frames 27–30 assigned to the functions available at a particular installation. MLS installations may not include all of the functions shown in FIG. 3. For example, flare guidance and back azimuth guidance may not be provided, and consequently time frames 28 and 30 may be assigned to other functions. Time frames 31 and 32 may be assigned to basic data words and time frame 33 may be left open for future use.

The time frames of a sequence are of various lengths, according to the function involved. Each time frame begins with the transmission of a preamble, followed by sector signals, and the remaining major portion of the time frame is occupied by transmission of the function signal. FIG. 4 shows the allocation of time slots within an approach azimuth time frame 29. The total length of frame 29 is approximately 15.9 ms., with the first 1.6 ms. thereof being assigned to a preamble 35, followed by 0.8 ms. of sector signals 36. The preamble 35 starts with about 0.8 ms. transmission of unmodulated r.f. carrier to allow airborne receivers to acquire the signal. In the next 0.3 ms., five 64 μs. Barker code DPSK pulses are transmitted for synchronization of airborne clocks with the ground unit clock. The preamble ends with the transmission of as many as seven 64 μs. DPSK pulses for identification of the function of the time frame, i.e., azimuth, elevation, etc. The sector signals 36 include time slots for ground equipment (station) identification, airborne antenna selection, OCI pulses, and a "TO" scan test pulse. The balance of time frame 29 is assigned to transmission of the azimuth scanning beam.

A complete cycle of the TDM signal format, shown in FIG. 5, comprises five repetitions of sequence no. 1 and three repetitions of sequence no. 2, in the order shown, within a period of about 615 ms. Data words may be interleaved between certain of the sequences.

It is the responsibility of the executive monitor to insure the integrity of each of the various signals described with reference to FIGS. 3 and 4. The statistical independence of the monitor from the MLS ground unit is maintained by deriving all monitored signals from the r.f. transmissions of the ground unit. For this purpose, referring to FIG. 1, an integral monitor antenna 10' is associated with scanning array antenna 10 and r.f. signal probes 14'-17' are respectively associated with OCI antennas 14–16 and data antenna 17 A near-field monitor antenna 18 is located within the coverage area of array 10 at a distance of about 150 feet from the array. Integral monitor antenna 10' is known in the art as comprising a slotted waveguide, or similar arrangement, positioned in close proximity to the array 10 and so designed that the signal output thereof simulates the signal output that would be obtained from an antenna placed in the far field along a fixed bearing from the center of array 10.

Figure 6:
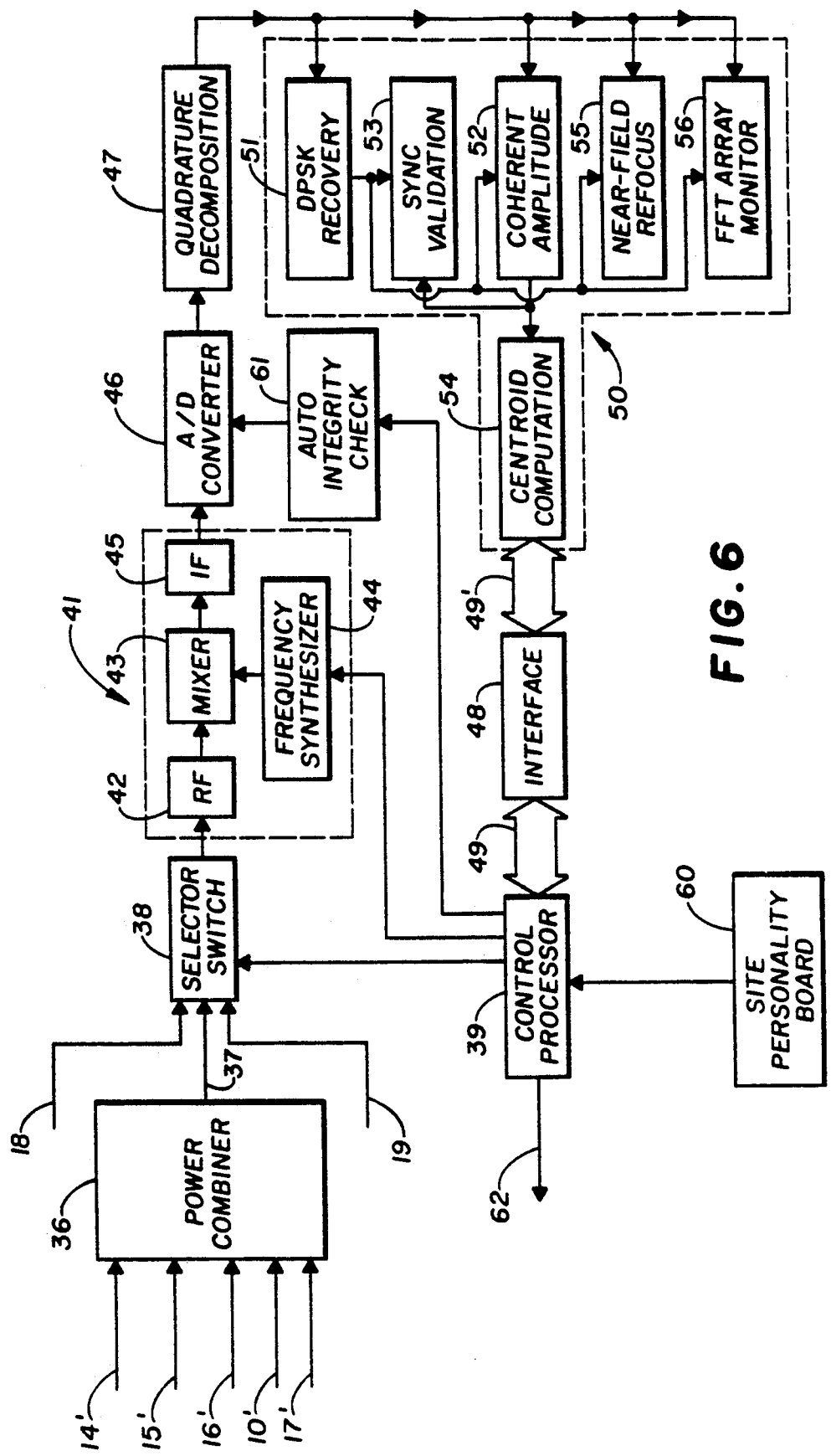
FIG. 6 is a functional block diagram of the monitor of the invention as applied to an MLS azimuth guidance unit.

Referring to FIG. 6, which is a functional block diagram of the executive monitor unit, the outputs of monitor antenna 10' and probes 14'-17' are combined in a power combiner 36. The MLS signal format includes provisions for two OCI pulses for each of the right, left and rear out-of coverage areas, should the MLS site conditions so require. Consequently, certain MLS installations may have two OCI antennas and associated r.f. probes for any out-of coverage area. If such additional OCI antennas are present, the outputs of their associated r.f. probes are also applied to power combiner 38.

The combined inputs to power combiner 36 are presented as a single output, hereinafter referred to as "integral monitor output 37", to an r.f. selector switch 38. Additional inputs to selector switch 38 are formed by the field monitor antenna 18 and an r.f. probe 19 associated with a stand-by electronics unit (not shown). Selector switch 38, controlled by a control processor 39, later described, supplies a selected one of the inputs 18, 19, or 37, to a down converter 41. Down converter 41 suitably comprises an airborne MLS receiver including an r.f. stage 42, a mixer 43, a frequency synthesizer local oscillator 44 that is tunable to all MLS frequency channels, and an i.f. stage 45. The i.f. output of down converter 41 is converted to digital form by an A/D converter 46 and the digitized i.f. is decomposed into in-phase (I) and quadrature (Q) components in a quadrature decomposition circuit 47. Alternatively, the i.f. output of down converter 41 may first be decomposed in a synchronous detector into I and Q components that are then separately digitized.

The digitized I and Q signal samples from circuit 47 are entered into a digital signal processor 50 that is directed by control processor 39 to perform various operations on the samples at specific times and intervals. Control processor 39 and signal processor 50 are interconnected through a monitor interface unit 48 and data and control buses 49 and 49'. The samples first in order of reception are processed through a DPSK recovery algorithm 51 to obtain the Barker code information from the preamble 35 (FIG. 4) of the MLS signal format. The Barker code information is used to synchronize the monitor clock (not shown) with the MLS ground unit clock and thereby provide the monitor with an independent source of synchronizing signals. Other DPSK information such as function identification and data words, is also obtained from algorithm 51. The recovery algorithm 51 preferred for use herein is described in U.S. Pat. No. 5,142,297, issued Aug. 25, 1992, titled, "Technique for Demodulating and Decoding MLS DPSK Transmissions Using a Digital Signal Processor". Said Pat. No. 5,142,297 is owned by the assignee of the present invention and is incorporated herein by reference.

Coherent I and Q samples are combined by a coherent amplitude algorithm 52 to provide resultant MLS signal amplitude samples at specific times within the signal format. Synch validation algorithm 53 receives specific amplitude samples generated by algorithm 52 and compares the time of occurrence of such amplitude samples with the times assigned to the transmission of those samples in the MLS signal format to verify the integrity of the ground Unit synchronization of the signal format. Coherent amplitude samples generated by algorithm 52 during the times assigned to transmission of the scanning beam are supplied to a centroid computation algorithm 54 for calculation of the arrival times of the To and FRO beam scans to assure the integrity of the angular guidance information transmitted by the ground unit.

During times field monitor antenna 18 is selected to furnish input to down converter 41, the I and Q sample outputs of circuit 47 obtained during certain beam scans are furnished to a near-field refocus algorithm 55 for reconstruction of the far-field antenna pattern from the near-field measurement data. The near-field refocus algorithm 55 and method of use are described and claimed in U.S. patent application Ser. No. 897,154, filed Jun. 11, 1992, titled "Method for Field Monitoring of a Phased Array Microwave Landing System Far Field Antenna Pattern Employing a Near Field Correction Technique". Said application is owned by the assignee of the present invention and is incorporated herein by reference.

During times integral monitor output 37 is selected to furnish input to down converter 41, the I and Q output samples from circuit 47 obtained during certain beam scans are applied to an FFT array monitor algorithm 56 for determination of the status of the radiating elements, phase shifters and related components of the ground unit phased array antenna. Algorithm 56 and the method of use thereof are described and claimed in U.S. Pat. No. 4,926,186, issued May 15, 1990, titled "FFT-Based Aperture Monitor for Scanning Phased Arrays".

Said Pat. No. 4,926,186 is owned by the assignee of the present invention and is incorporated herein by reference.

Signal processor 50 operates under the command of control processor 39 to perform algorithms 51-56 at intervals necessary, as given in Table I, below, to insure that any fault in any monitored element of the MLS signal format will be detected and appropriately responded to within one second. Inputs from a site personality board 60 tailor control processor 39 to the particular parameters of the MLS ground unit being monitored. The measured amplitudes, phases, times, and data which characterize the radiated format are conveyed to control processor 39 through interface unit 48 and buses 49, 49'. Control processor 39 filters the data received from signal processor 50, performs limit comparisons on the filtered data, and declares all executive alarms if an out of tolerance condition exists.

Control processor 39 periodically activates an auto integrity check circuit 61 to cause one of seven different t est frames to be injected into A/D converter 46 instead of the normal input thereto from down converter 41. The test frame is composed of i.f. signals that simulate the i.f. signals of a normal frame of the signal format, except that the test frame signals are out of tolerance in one or more respects. For example, a test frame that is substituted for an azimuth scan time frame of the signal format might contain an invalid function identification in the preamble; TO and FRO pulses of i.f. with incorrect time spacing, indicating an azimuth guidance angle error; and a pulse of i.f. having above normal amplitude that follows the FRO pulse, indicating excessive side lobe power. The test frame signals are digitized in A/D converter 46, decomposed into I and Q components by circuit 47 and applied to signal processor 50. Processor 50 treats the test frame signals in the same manner as signals from a normal frame of the format and passes the measured amplitudes, times and data obtained from the test frame to control processor 39. Control processor 39 must indicate an alarm status for each of the anomalous parameters of the test frame to allow continued operation of the MLS.

Table I, below, summarizes the monitored parameters of the signal format; alarm limits; and measurement rates used in the monitor of the invention. The alarm limits and measurement rates given in Table I are typical values that may vary depending on the particulars of the MLS installation. Whenever any monitored parameter of the signal format exceeds the alarm limit, and provided that all test frame parameters of the auto integrity check 61 have indicated an alarm status, control processor 39 generates an alarm signal on line 62. If the control processor 39 does not detect a fault in each one of the test frame parameters of auto integrity check 61, an alarm signal is generated on line 62, regardless of whether any fault has been indicated for any of the parameters of the normal signal format. Depending on the particular MLS installation, the alarm signal on line 62 may cause a switchover from the faulty ground electronics unit to a standby ground electronics unit and a consequent down-grading in service from CAT III operations to CAT II operations. If only CAT II service is provided by the MLS, the appearance of an alarm on line 62 will cause the station to shut down.

Figure 7:
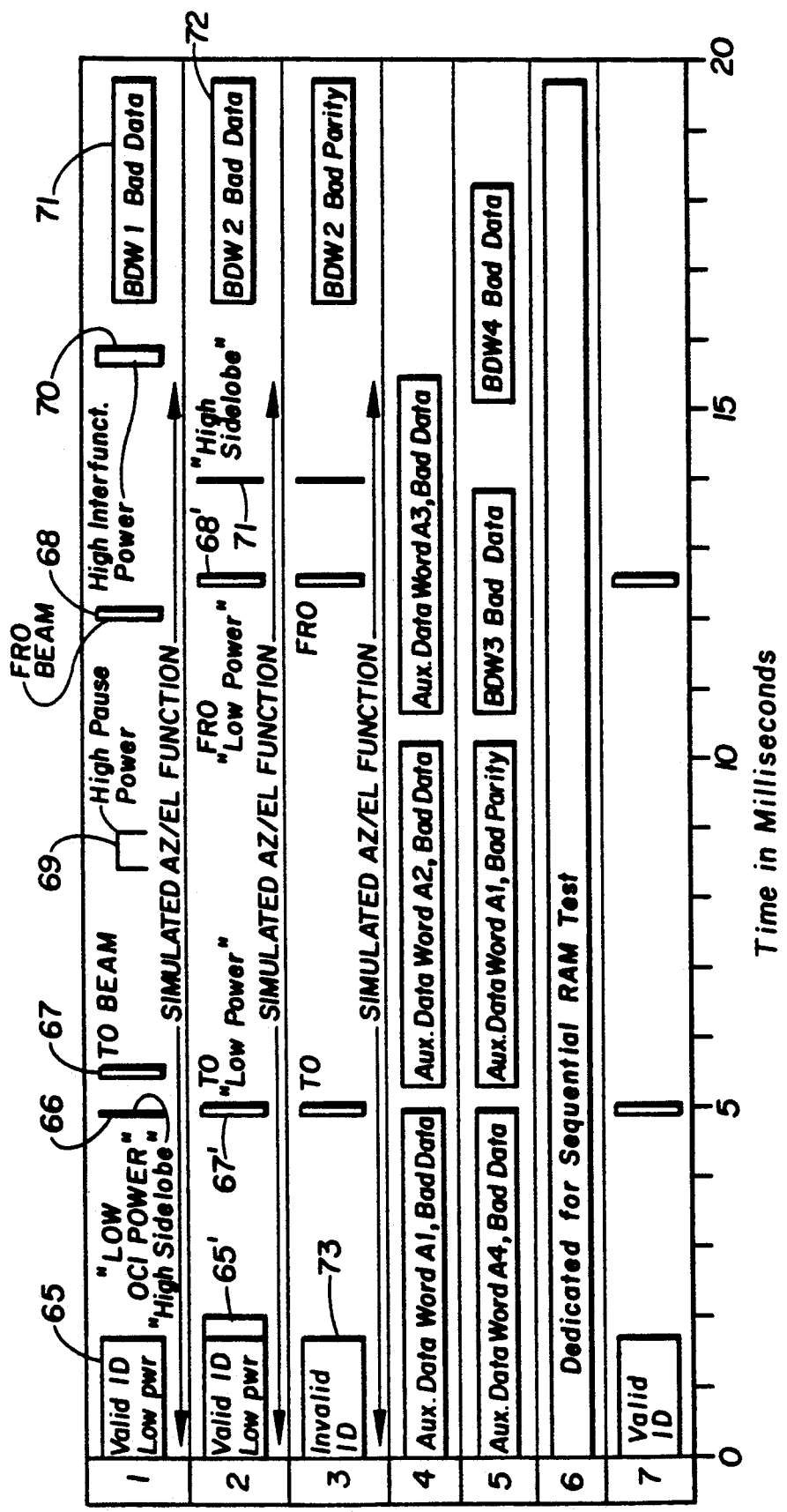
FIG. 7 is a representation of the test frames used in the auto integrity check feature of the invention.

FIG. 7 is a representation of the test frames of the auto integrity check 61. In test frame #1, preamble 65 contains a valid function identification code but at a power level less than −1.5 dB below normal. The OCI pulses (not shown) appear at proper times but at power levels below −1.5 dB below normal. A sidelobe pulse 66 appears at a power level greater than −12 dB above the maximum normal sidelobe power. The TO bean scan pulse 67 appears at later than normal time and the FRO beam scan pulse 68 appears at earlier than normal time, indicating a guidance error of more than −0.030° below the true azimuth or elevation angle of the monitor antenna. Pause pulse 69 appears midway between TO pulse 67 and FRO pulse 68 at a power level greater than −12 dB above maximum normal sidelobe power. Pulse 70 appears after the normal end of a time frame of the signal format at a power level greater than −24 dB below maximum normal sidelobe power. Finally, test frame #1 includes BDW1 (basic data word #1) 71 that is encoded with bad data.

Test frame #2 includes a preamble 65' having a valid function identification at a below normal power level, a TO pulse 67' and a FRO pulse 68', both of which are at power levels lower than −1.5 dB below normal. TO pulse 67' appears earlier than normal and FRO pulse 68' appears later than normal, indicating a guidance angle error greater than +0.030° above normal. Further included in test frame #2 are a pulse 71 at a power level −12 dB above maximum normal sidelobe power and BDW2 72 containing bad data.

Test frame #3 differs from test frame #2 in that the preamble 73 is encoded with an invalid function identification and that the parity of BDW2 is incorrect. Test frames #4 and #5 contain auxiliary data words A1-A4 and basic data words 3 and 4, each of which is erroneous either as to data or parity. Test frame #6 reserves time for sequential tests of the control processor 39 and signal processor 50 RAM units, which tests do not involve injection of simulated i.f. signals into A/D converter 46. Test frame #7 contains a simulated normal AZ or EL function time frame used for testing the FFT-based array monitor algorithm 56.

The foregoing description has been limited, in general, to the invention as applied to monitoring the MLS ground-based azimuth guidance unit. The complete executive monitor for the MLS includes a monitor corresponding to that of FIG. 6 that is programmed to check the elevation time frames of the signal format and sector signals associated therewith. Preferably, the elevation monitor is located within the shelter f or the MLS elevation array antenna. Alternatively, the monitor of FIG. 6 can be arranged to check both the azimuth and the elevation guidance functions of the signal format, but such an arrangement involves long r.f. transmission lines to couple elevation signal pick-ups and monitor antennas to the power combiner 36 of FIG. 6.

TABLE I

| Parameter | Sensor | Typical Alarm Limit | Typical Measurement Rate (Hz) |
| --- | --- | --- | --- |
| Mean Angle Error | IM* | 0.030° (AZ) 0.062° (EL) | 10 (AZ) 29 (EL) |
| Mean Angle Error | FM* | 0.036° (AZ) 0.067° (EL) | 3 (AZ) 10 (EL) |
| Preamble ERP* | IM | −1.5 to +2 dB | Function Data Rate |
| Scanning Beam ERP | IM | −1.5 to +2 dB | Function Data Rate |
| Essential AUX Data Words | IM | 2 Consecutive Errors | Function Data Rate |
| Preamble Codes | IM | 1 Error/Sec | Function Data Rate |
| Basic Data Words | IM | 2 Consectutive Errors | Function Data Rate |
| TDM Sequence Sync | IM | ±100 μs | Once/615 ms |
| ERP of OCI Pulses | IM | −1.5 dB | Function Data Rate |
| Peak Dynamic Sidelobe ERP | IM | Peak Exceeds −12 dB SB Power on More Than 25% Scans in Any 1 sec. | Function Data Rate |
| Erroneous Signals Between Functions | IM | Peak Exceeds −24 dB SB Power More than Once/sec. | Sample Every 64 μs. |
| Auto Integrity Check | AIC | Test Frame Dependent | 1/80th Real Function Data Rate |
| FFT Array Monitor | IM | | Once every 10 secs |

IM* — Integral Monitor Antenna
FM* — Field Monitor Antenna
ERP* — Effective Radiated Power Obviously, modifications and variations of the invention are possible in the light of the above teachings. It is therefore to be understood that the invention may be practiced otherwise than as specifically disclosed without departing from the spirit and scope of the appended claims.

The invention claimed is:

1. The method of monitoring the signal format of radio frequency (r.f.) transmissions by a ground-based unit of a Microwave Landing System (MLS) to insure the integrity of said signal format, said signal format containing synchronizing signals, identification, data, and signal events in accordance with predetermined standards; comprising the steps of:

receiving the r.f. signal transmissions of said MLS ground unit by a monitor receiver that is independent of any physical electrical connection to said ground unit;

down-converting said received r.f. signal transmissions to intermediate frequency (i.f.) signals;

decomposing said i.f. signals into digitized in-phase (I) and quadrature (Q) components;

recovering from said I and Q components said synchronizing signals contained in said signal format for use in timing the appearance of said signal events occurring in said signal format;

recovering from said I and Q components each of said identification, data, and signal events contained in said signal format;

comparing each of said recovered synchronizing, identification, data, and signal events with said predetermined standards therefor;

generating an alarm signal whenever any one of said recovered synchronizing, identification, data, or signal events departs from said predetermined standards by more than a tolerable amount;

periodically substituting for said down-converted received r.f. signal transmissions simulated i.f. signals, said simulated i.f. signals including simulated identification, data and signal events corresponding to like elements of said signal format except that each of said simulated identification, data and signal events is out-of-tolerance with respect to said predetermined standards;

performing said steps of decomposing, recovering and comparing for each of said simulated identification, data, and signal events; and generating an alarm signal whenever said comparing step for each of said simulated identification, data, and signal events fails to disclose an out-of-tolerance condition with respect to said predetermined standards.

2. A method as claimed in claim 1, with the additional steps of:

measuring the effective radiated power of each of said recovered identification, data, and signal events contained in said signal format;

comparing said measured effective radiated power of each of said identification, data, and signal events with predetermined standards therefor; and generating an alarm signal whenever any of said compared measured effective radiated powers differs from said predetermined standards by more than a tolerable amount.

3. A method as claimed in claim 2 wherein said simulated i.f. signals additionally contain identification, data and signal events that are out of tolerance with respect to effective radiated power, and with the additional steps of:

measuring the effective radiated power of each of said recovered identification, data, and signal events contained in said simulated i.f. signals;

comparing said measured effective radiated power of each of said identification, data, and signal events of said simulated i.f. signals with predetermined standards therefor; and generating an alarm signal whenever any of said compared measured effective radiated powers of said simulated i.f. signals fails to differ from said predetermined standards by more than a tolerable amount.

4. A method as claimed in claim 1, wherein said MLS ground unit includes a phased array antenna for transmitting a portion of said signal format as a scanning beam, with the additional steps of:

processing selected ones of said I and Q components in accordance with a Fast Fourier Transform algorithm to obtain a reconstructed aperture function of said phased array antenna;

comparing said reconstructed aperture function with predetermined standards therefor; and generating an alarm signal whenever said reconstructed aperture function departs from said standards therefor by more than a tolerable amount.

5. A method as claimed in claim 1, wherein said MLS ground unit includes a phased array antenna for transmitting a portion of said signal format as a scanning beam, and wherein said receiving step includes:

receiving the r.f. transmissions of said MLS ground unit through a monitor antenna that is located in the near field of said phased array antenna, said monitor antenna providing input signals to said monitor receiver; and with the additional steps of:

processing selected ones of said I and Q components in accordance with a near field refocusing algorithm to obtain a reconstructed far field antenna pattern of said phased array antenna;

comparing said reconstructed far field antenna pattern with predetermined standards therefor; and generating an alarm signal whenever said reconstructed far field antenna pattern departs from said standards therefor by more than a tolerable amount.

* * * * *